(12) United States Patent
Morard et al.

(10) Patent No.: US 10,402,678 B2
(45) Date of Patent: Sep. 3, 2019

(54) METHOD AND A DEVICE FOR ESTIMATING A QUALITY INDEX FOR A 3D IMAGE OF A COMPOSITE MATERIAL PART

(71) Applicants: SAFRAN AIRCRAFT ENGINES, Paris (FR); SAFRAN, Paris (FR)

(72) Inventors: Vincent Morard, Versailles (FR); Estelle Parra, Fontenay Le Vicomte (FR); Julien Schneider, Moissy-Cramayel (FR); David Tourais, Paris (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 0 days.

(21) Appl. No.: 15/314,046

(22) PCT Filed: May 22, 2015

(86) PCT No.: PCT/FR2015/051359
§ 371 (c)(1),
(2) Date: Nov. 25, 2016

(87) PCT Pub. No.: WO2015/181477
PCT Pub. Date: Dec. 3, 2015

(65) Prior Publication Data
US 2017/0154235 A1    Jun. 1, 2017

(30) Foreign Application Priority Data
May 26, 2014    (FR) ...................................... 14 54731

(51) Int. Cl.
*G06K 9/00*    (2006.01)
*G06K 9/46*    (2006.01)
*G06T 7/00*    (2017.01)

(52) U.S. Cl.
CPC .......... *G06K 9/4647* (2013.01); *G06T 7/0002* (2013.01); *G06T 7/0004* (2013.01);
(Continued)

(58) Field of Classification Search
None
See application file for complete search history.

(56) References Cited

U.S. PATENT DOCUMENTS

2007/0019861 A1* 1/2007 Zwanger ............... G06T 7/0002
382/171

FOREIGN PATENT DOCUMENTS

| CN | 102183525 A | 9/2011 |
|----|-------------|--------|
| WO | 2013/027553 A1 | 2/2013 |
| WO | 2014/023893 A1 | 2/2014 |

OTHER PUBLICATIONS

Johann Kastner, et al., "Defect and Porosity Determination of Fibre Reinforced Polymers by X-ray Computer Tomography," 2nd International Symposium on NDT in Aerospace 2010, Jan. 1, 2010, pp. 1-12.*

(Continued)

*Primary Examiner* — Fred H Hu
(74) *Attorney, Agent, or Firm* — Oblon, McClelland, Maier & Neustadt, L.L.P.

(57) ABSTRACT

The method of estimating a quality index of a gray-scale encoded three-dimensional image of a composite material part includes an obtaining step for obtaining a histogram from the image, the histogram representing for each class of a plurality of classes each including at least one gray-scale level, the number of voxels of the image having a gray-scale level belonging to the class; an extraction step for extracting a predetermined number of Gaussian functions present in the histogram; and an estimation step for estimating at least one (Continued)

quality index of the image from parameters characterizing the Gaussian functions extracted from the histogram.

12 Claims, 3 Drawing Sheets

(52) U.S. Cl.
CPC ............... *G06T 2207/10072* (2013.01); *G06T 2207/30164* (2013.01); *G06T 2207/30168* (2013.01)

(56) References Cited

OTHER PUBLICATIONS

Yakoub Bazi, et al., "Image thresholding based on the EM algorithm and the generalized Gaussian distribution," Pattern Recognition, vol. 40, No. 2, Oct. 29, 2006, pp. 619-634.*

Johann Kastner, et al., "Defect and Porosity Determination of Fibre Reinforced Polymers by X-ray Computed Tomography," $2^{nd}$ International Symposium on NDT in Aerospace 2010—We.1.A.2, http://www.ndt.net/article/aero2010/papers/we1a2.pdf, XP055158650, Jan. 1, 2010, pp. 1-12.

Yakoub Bazi, et al., "Image thresholding based on the EM algorithm and the generalized Gaussian distribution," Pattern Recognition, vol. 40, No. 2, XP005837137, Oct. 29, 2006, pp. 619-634.

Ali Musrrat, et al., "Multi-level image thresholding by synergetic differential evolution," Applied Soft Computing, vol. 17, XP028614045, Dec. 31, 2013, pp. 1-11.

A.N. Houston, et al., "Effect of scanning and image reconstruction settings in X-ray computed microtomography on quality and segmentation of 3D soil images," Geoderma, vol. 207, XP028676164, Jun. 11, 2013, pp. 154-165.

Prashanth Reddy Marpu, et al., "A Procedure for Automatic Object-Based Classification," http://www.isprs.org/proceedings/XXXVI/4-C42/Papers/12_Object-based approach generic issues—ICI/OBIA2006_Marpu_Niemeyer_Gloaguen.pdf, Retrieved on Dec. 15, 2014, XP055158662, Jan. 1, 2008, 5 pages.

International Search Report dated Sep. 9, 2015 in PCT/FR2015/051359 filed May 22, 2015.

Chinese Office Action issued in Chinese Patent Application No. 201580041115.8 dated Nov. 2, 2018 (w/ English Translation), citing document AO therein.

* cited by examiner

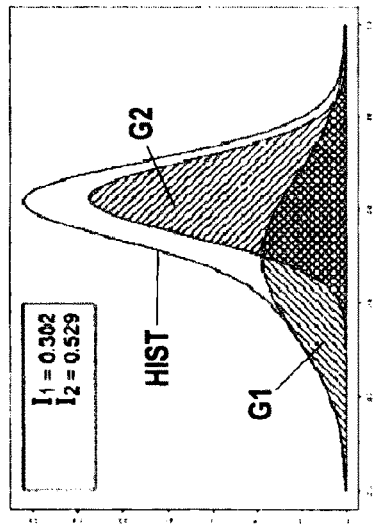
FIG.4A
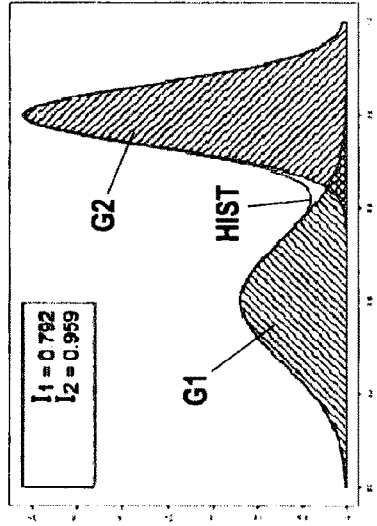
FIG.4B
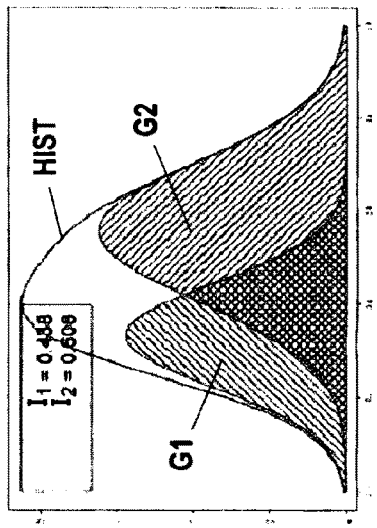
FIG.4C
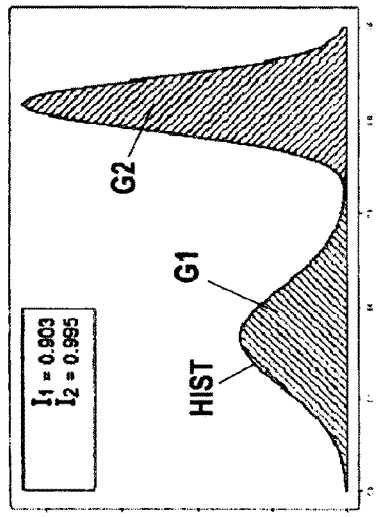
FIG.4D
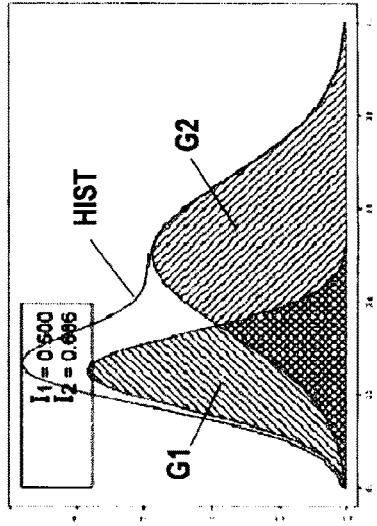
FIG.4E
FIG.4F

METHOD AND A DEVICE FOR ESTIMATING A QUALITY INDEX FOR A 3D IMAGE OF A COMPOSITE MATERIAL PART

BACKGROUND OF THE INVENTION

The invention relates to the general field of imaging, and more particularly to three-dimensional images (or 3D images) of parts (i.e. pieces) made of composite materials (e.g. parts made of carbon fibers and a carbon matrix or resin), such as for example images of composite material parts obtained by computed tomography.

A preferred but non-limiting application of the invention lies in numerous branches of engineering industry, and in particular in the aviation industry.

It is known at present to perform non-destructive inspection of composite material parts by using 3D images obtained by computed tomography, in particular to inspect the health of the material (i.e. absence of defects) of such parts.

Computed tomography is an imaging technique that makes use of a succession of photographs taken of a composite material part in order to reconstruct a three-dimensional image of the part that is encoded on a gray scale. The gray-scale level of a voxel in the 3D image is proportional to the density of the material of the part in that voxel. By using suitable image-analysis techniques, the 3D image makes it possible to detect automatically defects, if any, affecting the inspected material part.

Nevertheless, certain image-analysis methods are highly dependent on the quality of the 3D tomographic image under consideration.

In the state of the art, there exist standards that describe methods for measuring the quality of a tomographic image. By way of example, such standards include:

- the E1441-00RT standard of the American Society for Testing and Materials (ASTM), as described in the document entitled "Standard guide for computed tomography imaging", which defines using computed tomography for non-destructive inspection and tomography quality metrics; and
- the equivalent European standard NF EN 16016-3 described in greater detail in the document entitled "Essais non destructifs— Méthodes par rayonnements—Tomographie informatiisée Partie 3: Fonctionement et interprétation" [Non-destructive testing—radiation methods—computed tomography—part 3: operation and interpretation].

Those standards propose specifically the following quality metrics or indices:

- a standard deviation of noise measured over a uniform zone of the 3D image that is not deformed by artifacts;
- a signal-to-noise ratio defined as being the ratio of the mean gray-scale level of the material part under consideration divided by the standard deviation of the noise; and
- a contrast-over-noise ratio defined as being the ratio of the absolute value of the difference between the mean gray-scale level of the part under investigation and the mean gray-scale level of the background of the 3D image divided by the standard deviation of the noise.

Nevertheless, those metrics are designed for a part made of a single material, typically for a metal part.

Unfortunately, with a composite material, it is not possible to find in the 3D image a homogeneous zone, i.e. made up of a single phase of material, that is sufficiently representative (i.e. large enough to be statistically viable), since the fibers and the resin are intimately intermingled by construction in a composite material.

Consequently, if it is desired to use such metrics for estimating the quality of a 3D image of a composite material part, it is necessary to add reference bars that are themselves made of a single material in the setup under consideration while acquiring the 3D image so as to enable such metrics to be estimated.

Even when such a constraint is satisfied, it still remains that the metrics that are obtained involve only one phase of material (and possibly also the background of the 3D image, depending on the metrics under consideration), and are therefore incomplete for characterizing the quality of a 3D image of a part made of composite material.

OBJECT AND SUMMARY OF THE INVENTION

The present invention serves in particular to mitigate those drawbacks by proposing a method enabling the quality of a 3D image of a composite material part to be estimated in a manner that is automatic and objective.

More specifically, the invention proposes an estimation method for estimating at least one quality index of a gray-scale encoded three-dimensional image of a composite material part, the estimation method comprising:

- an obtaining step for obtaining a histogram from the image, representing, for each class of a plurality of classes each comprising at least one gray-scale level, the number of voxels of the image having a gray-scale level belonging to the class;
- an extraction step for extracting a predetermined number of Gaussian functions present in the histogram; and
- an estimation step for estimating at least one quality index of the image from parameters characterizing the Gaussian functions extracted from the histogram.

Correspondingly, the invention also provides an estimation device for estimating at least one quality index of a gray-scale encoded three-dimensional image of a composite material part, the estimation device comprising:

- a module for obtaining a histogram from the image, representing for each class of a plurality of classes each comprising at least one gray-scale level, the number of voxels of the image having a gray-scale level belonging to the class;
- a module for extracting a predetermined number of Gaussian functions present in the histogram; and
- a module for estimating at least one quality index of the image from parameters characterizing the Gaussian functions extracted from the histogram.

No limitation is associated with the origin of the 3D image. It may be a 3D image reconstituted by computed tomography or by any other means.

The invention proposes a method that is robust, fast (requiring only a few seconds per image), and repeatable that provides an objective tool for measuring the quality of a gray-scale encoded 3D image of a composite material part. The method does not require any reference image or bar, nor does it require any special tooling to be able to estimate the quality indices, thus making it particularly simple to perform.

The invention relies advantageously on the facts firstly that the quality of the 3D image is affected essentially by random noise associated with the image acquisition system and of distribution that is substantially Gaussian (possibly after prior processing of the 3D image in order to eliminate low-frequency artifacts present in the image), and secondly that the various phases of a composite material do not have the same material density and are therefore "visible" (i.e. they can be distinguished) in the 3D image (specifically they correspond to different gray-scale levels). It results from these observations that the gray-scale levels of the 3D image corresponding to the various phases of the composite material (e.g. resin, strands, fibers, etc.) have Gaussian spreads. The inventors thus propose deconvoluting the histogram of the 3D image into Gaussian functions (or in equivalent manner into Gaussian distributions if the histogram is normalized), and then make use of the parameters characterizing the Gaussian functions extracted by this deconvolution in order to derive quality indices of the 3D image.

Specifically, for a perfect 3D image acquisition system (i.e. without noise), the various phases of the composite material should give rise in the histogram of the 3D image to representations of the Dirac function type, that are completely separated and positioned at gray-scale levels corresponding respectively to the material densities associated with the various phases. The presence of random Gaussian noise has the effect of transforming these Dirac functions into Gaussian functions. In other words, the histogram of the 3D image is constituted by a mixture (sum) of Gaussian functions.

The inventors have had the idea of advantageously making use of the parameters that characterize these Gaussian functions in order to derive quality indices of the 3D image, and in particular to make use of their means and/or standard deviations (or in equivalent manner of their variances), and/or indeed of the proportion of each Gaussian function within the mixture of Gaussian functions represented by the histogram of the 3D image. Specifically, the more the Gaussian functions are isolated and spaced apart from one another, the more the 3D image can be considered as being of good quality. On the contrary, the more the Gaussian functions are close together and superposed, the more the 3D image can be considered as being of poor quality.

The number of Gaussian functions extracted from the histogram depends on the composite material under consideration and preferably corresponds to the number of distinct phases present in the composite material under consideration. It is preferably selected to be equal to 2 or to 3.

It should be observed that the method proposed by the invention does not depend on any external parameter, other than the number of Gaussian functions. Consequently it is relatively easy to implement.

By way of example, the step of extracting the Gaussian functions (or in equivalent manner of deconvoluting the Gaussian functions) may be performed by using an expectation maximization (EM) algorithm. This algorithm is described in detail in the document by A. P. Dempster et al., entitled "Maximum likelihood from incomplete data with the EM algorithm", Journal of the Royal Statistical Society, Series B39 (1): 1-38.

It makes it possible to estimate automatically and accurately the various parameters characterizing the Gaussian functions mixed together in the histogram of the 3D image.

In addition, it can be used even when only a small density difference exists between the different phases of the composite material. Specifically, since the composite material is made of a resin and of resin-impregnated fibers, low contrast might be observed on the 3D image between the phases of the composite material. In addition, such components may be present in the composite material at very different proportions. The EM algorithm makes it possible to avoid difficulties that result from these characteristics of composite materials and enables the Gaussian functions (and their parameters) that are mixed together in the histogram of the 3D image to be extracted easily and automatically.

In a variant, other methods may be used for extracting the Gaussian functions from the histogram and for determining their parameters, such as for example a Monte Carlo method based on Markov chains, a moment matching method, a spectral or graphical method, or indeed a simulation.

In a particular implementation, said at least one quality index of the image comprises an index I1 obtained by averaging on each pair ($G_i$, $G_{i+1}$) of contiguous Gaussian functions extracted from the histogram a quality index I1($i$) associated with said pair ($G_i$, $G_{i+1}$) and estimated using:

$$I1(i)=f(m_i-m_{i+1}+\omega \cdot (\sigma_i+\sigma_{i+1}))$$

where:
- $m_i$ and $m_{i+1}$ designate the respective means of the Gaussian functions $G_i$ and $G_{i+1}$, with $m_i < m_{i+1}$;
- $\sigma_i$ and $\sigma_{i+1}$ designate the respective standard deviations of the Gaussian functions $G_i$ and $G_{i+1}$;
- $\omega$ designates a predetermined constant; and
- $f$ designates a bounded function having values in the range 0 to 1.

By way of example, the function $f$ is a sigmoid function or a function defined from the hyperbolic tangent function. It is preferably selected so that the quality index I1 tends towards 1 when the Gaussian functions are well separated and towards 0 when they coincide or are superposed (impossibility of separating the different phases of the material in the 3D image).

In another implementation, said at least one quality index of the image comprises an index I2 quantifying overlap between the Gaussian functions extracted from the histogram.

The greater the extent to which the Gaussian functions are superposed, the greater the overlap zone, and the more doubtful the quality of the 3D image.

In yet another implementation, said at least one quality index of the image comprises, for at least one Gaussian function G extracted from the histogram, an index I3(G) associated with said Gaussian function and defined as the ratio between the mean and the standard deviation of that Gaussian function.

In other words, in this implementation, the signal-to-noise ratio is evaluated for each Gaussian function independently of the others.

It should be observed that calculating the signal-to-noise ratio is widely used in the state of the art for estimating the quality of an image. Nevertheless, as mentioned above, for a part made of composite material, it is very difficult or even impossible to find a region of material that is completely homogeneous in order to measure the standard deviation of the noise.

By means of the step of extracting Gaussian functions from the histogram of the 3D image, the invention makes it very easy to calculate an accurate signal-to-noise ratio for each extracted Gaussian function, which then constitutes a homogeneous zone making such a calculation possible. Furthermore, the Rose criterion, known to the person skilled in the art, states that it is possible to distinguish the characteristics of an image with 100% confidence for a signal-to-noise ratio greater than 5.

Naturally, other quality indices may be considered and estimated on the basis of the parameters of the Gaussian functions extracted from the histogram of the 3D image.

It should be observed that the above-mentioned indices do not necessarily vary in similar manner as a function of the quality of the 3D image. The choice of one and/or another of the above-specified indices, or of several of those indices, depends on the intended application. By way of example, these indices may advantageously be used for optimizing the acquisition and reconstruction parameters of tomographic 3D images in order to compare 3D images coming from mutually different acquisition systems (e.g. a plurality of pieces of tomographic equipment), in order to detect defects of an acquisition system (e.g. drifts in the detector or in the X-ray tube of tomographic equipment on a production line), etc. In other words, the invention is applicable both to surveying pieces of equipment and to use on a production line (e.g. for quality control).

In another particular implementation, the estimation method further comprises a step of normalizing the histogram, the Gaussian functions being extracted from the normalized histogram during the extraction step (the Gaussian functions are then Gaussian distributions proper).

This normalization makes it possible to be unaffected by the size (i.e. the number of voxels) of the 3D image under consideration. The quality indices then obtained for different 3D images can easily be compared with one another, even when the images are of different sizes.

In another implementation, the estimation method further comprises a step of normalizing parameters characterizing the Gaussian functions, said at least one quality index of the image being estimated from normalized parameters characterizing the Gaussian functions.

This produces a quality index lying in the range 0 to 1, that is easy to interpret.

In a particular implementation, the various steps of the estimation method are determined by computer program instructions.

Consequently, the invention also provides a computer program on a data medium, the program being suitable for being performed in an estimation device or more generally in a computer, the program including instructions adapted to performing steps of an estimation method as described above.

The program may use any programming language, and may be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other implementations, it is also possible to envisage that the estimation method and device of the invention present in combination all or some of the above-specified characteristics.

BRIEF DESCRIPTION OF THE DRAWINGS

Other characteristics and advantages of the present invention appear from the following description made with reference to the accompanying drawings which show an implementation having no limiting character. In the figures:

FIGS. 4A to 4F show how quality indices estimated using the estimation method of the invention vary as a function of the parameters of the extracted Gaussian functions.

DETAILED DESCRIPTION OF THE INVENTION

Figure 1:
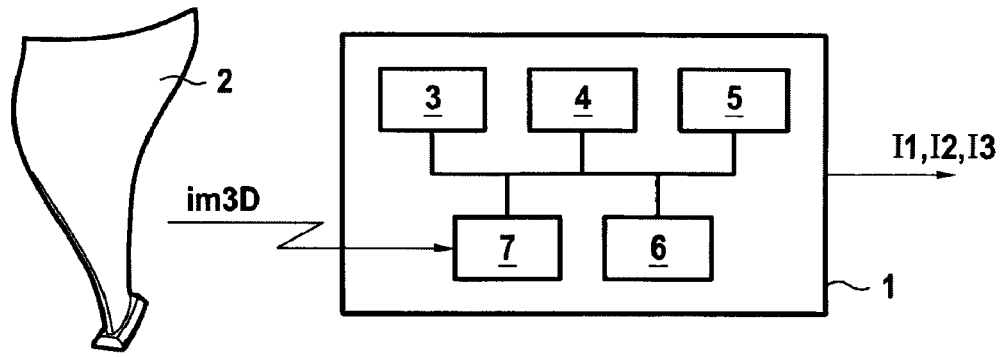
FIG. 1 shows an estimation device in accordance with the invention, in a particular embodiment.

FIG. 1 shows, in its environment, an estimation device 1 for estimating at least one quality index of a three-dimensional image im3D of a composite material part 2, the device constituting a particular embodiment of the invention.

The presently-described part is an airplane fan blade made of composite material constituted by carbon fibers impregnated with a carbon matrix (resin).

Nevertheless, this example is given purely by way of illustration and no limitation is associated with the type of part under consideration, nor even with the composite material from which the part is made. Thus, the invention is applicable to any type of composite material having woven, braided, or indeed stitched fiber reinforcement, and finds numerous applications particularly but not exclusively in the field of aviation and constructing airplane parts. In addition, the 3D image under consideration may equally well represent the part 2 in full or merely a sample thereof.

In the presently-described example, the image im3D is a gray-scale encoded 3D image obtained by computed tomography. As mentioned above, computed tomography is a known digital imaging technique that consists in using an X-ray generator to emit a beam through the part so as to acquire a succession of "photographs" or radiographs of the part in different planes of the three dimension space. These photographs or radiographs, also referred to as intermediate images or indeed as projections, are subsequently processed and combined in order to reconstruct the three-dimensional volume of the part in the form of a gray-scale encoded 3D image.

The gray-scale level of a voxel of the image im3D is proportional to the density of the material of the composite material part 2 in that voxel. Since the resin and the carbon fibers constituting the composite material of the part 2 do not have the same densities, they thus ought to appear in theory with different gray-scale levels in the image im3D.

In general, it is assumed that a predetermined number K of material phases can be distinguished in the three-dimensional image im3D, where K is an integer greater than or equal to 2. In the presently-described example, it is assumed for simplification purposes that K=2.

It should be observed that when using an X-ray tomography technique, so-called "low-frequency" artifacts may be present in the 3D images obtained after reconstruction, which artifacts can disturb analysis of the images, these artifacts giving rise to drift in the gray-scale levels that represent the same material (e.g. the resin or the fibers). Thus, by way of example, the mean value of the gray-scale levels of the resin need not be constant over the entire image, because of the presence of such artifacts.

Various kinds of processing may be applied to the 3D image in order to limit the influence of these artifacts.

A first approach can consist in selecting a sample of the 3D image that is small in size and that is located at a position in the part 2 where these artifacts have no influence.

A second approach can consist in detecting drift in the gray-scale levels for a given material and in correcting it using conventional correction techniques.

In the resulting corrected image, a sample of the part 2 may then be selected that is of any size and location.

In the description below, the image im3D is the 3D image of the part 2 or a suitably selected sample of that part 2 in which the influence of the above-mentioned low-frequency artifacts can be considered as being negligible, possibly as a result of applying treatment to the 3D image using one or the other of the above-proposed approaches, for example. As a result, the quality of the image im3D under consideration is affected essentially by random noise, which is of distribution that is substantially Gaussian.

In a variant, it is possible to envisage using other techniques for obtaining a gray-scale encoded 3D image of the composite material part 2, e.g. a transmission electron microscope (TEM) technique.

In the presently-described embodiment, the estimation device 1 is a computer of hardware architecture that comprises in particular a processor 3, memories 4-6 (e.g. a ROM and/or a hard disk 4, a random access memory (RAM) 5, and a non-volatile memory 6), and communication means 7. The communication means 7 comprise in particular input/output means (e.g. a mouse, a keyboard, a screen, etc.) and one or more communication interfaces of various kinds (e.g. a universal serial bus (USB) port, a network card, etc.) enabling the estimation device 1 specifically to obtain the three-dimensional image im3D.

The ROM and/or the hard disk 4 constitutes a data medium readable by the processor 3 and storing a computer program in accordance with the invention, including instructions for executing steps of a method of the invention for estimating at least one quality index of a three-dimensional image, the steps of the method being described below with reference to FIG. 2, in a particular implementation.

In equivalent manner, the computer program defines functional modules of the estimation device 1 (software modules in this example), such as a module for obtaining a histogram from a 3D image, a module for extracting Gaussian distributions from the histogram, and a module for estimating quality indices from parameters characterizing the extracted Gaussian distributions. The functions of these modules are described in greater detail with reference to the steps of the estimation method.

Figure 2:
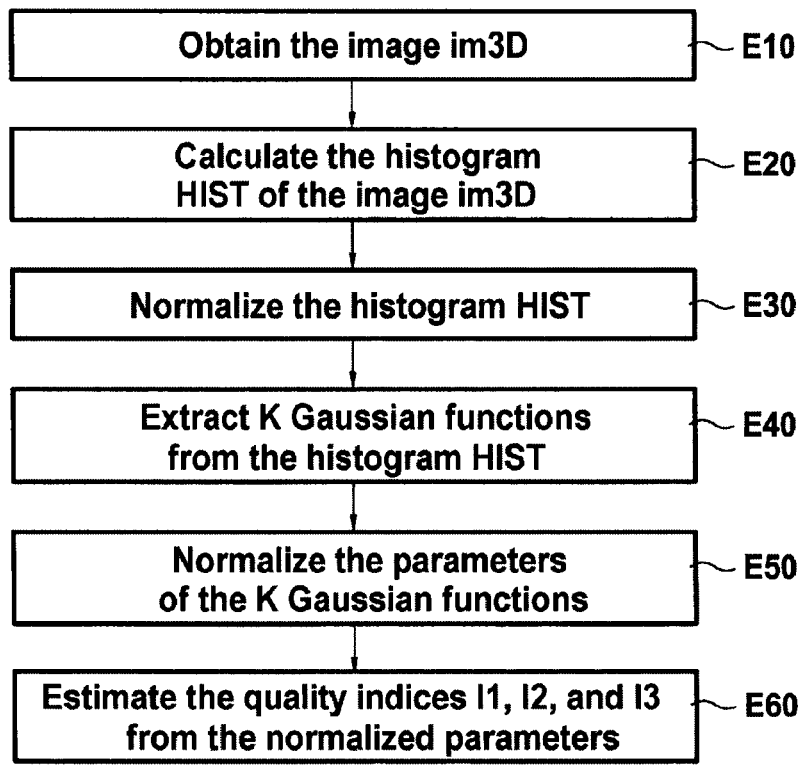
FIG. 2 is a flow chart showing the main steps of an estimation method in accordance with the invention in an implementation in which it is performed by the estimation device of FIG. 1.

With reference to FIG. 2, there follows a description of the main steps of the estimation method of the invention in a particular implementation in which they are performed by the estimation device 1 shown in FIG. 1.

In the presently-described embodiment, the estimation device 1 estimates a plurality of quality indices I1, I2, and I3 for the three-dimensional image im3D. The image is supplied via its communication means 7 (step E10).

In a variant, the invention may be applied to a portion only of the image im3D. All of the steps described below are then performed on that portion only of the image im3D.

On receiving the image im3D, the estimation device 1 calculates the histogram HIST of the image im3D (step E20).

The histogram HIST is a graphical representation giving, for each class of a plurality of gray-scale classes (plotted along the abscissa axis of the histogram), the number of voxels in the image im3D having gray-scale levels lying within the class (plotted up the ordinate axis of the histogram). It serves advantageously to group together the information contained in the image im3D without worrying about the spatial organization of the voxels of the image.

Each gray-scale class may comprise one or more gray-scale levels. In the presently-described implementation, the number of classes and the number of gray-scale levels per class used for constructing the histogram HIST depend on the dynamic range DYN of the image im3D.

More precisely, in this example, for dynamic ranges DYN measured in bits that are less than or equal to 16 bits, one gray-scale level is used per class, in other words for a dynamic range of DYN bits, 2DYN gray-scale levels are used. For images having a dynamic range greater than 16 bits or a floating point dynamic range, the number of classes represented in the histogram HIST is limited to $2^{16}$=65536 classes.

Thus, by way of example, for an image having dynamic range DYN=32 bits, the histogram HIST has $2^{16}$ classes each having $2^{16}$ gray-scale levels.

Likewise, for a 3D image having a floating point dynamic range, the maximum number of classes is set at $2^{16}$, and the number of gray-scale levels contained in each class is calculated automatically, while taking account of the minimum value and of the maximum value of the gray-scale levels likely to be present in the image.

Naturally, other assumptions concerning the number of classes and the number of gray-scale levels per class may be envisaged in order to construct the histogram HIST, in particular as a function of a compromise between complexity and the accuracy desired for the information reproduced by the histogram.

Figure 3A:
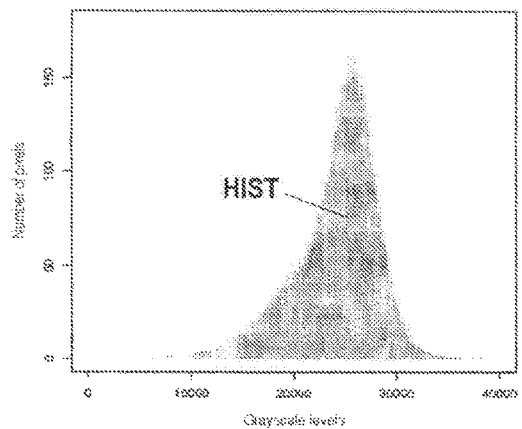
FIG. 3A to 3D show a histogram obtained from a tomographic 3D image together with Gaussian functions extracted from the histogram in accordance with the invention.

By way of example, FIG. 3A shows the histogram of a 3D tomographic image of a composite material part having a dynamic range of 16 bits.

In the presently-described embodiment, the estimation device 1 normalizes to 1 the histogram HIST obtained in step E20 in a step E30. This (optional) normalization seeks to make the histogram HIST independent of the number of voxels in the image im3D.

This normalization is performed by the estimation device 1 by dividing for each gray-scale class the number of voxels belonging to the class as marked on the histogram HIST by the total number of voxels in the 3D image. The ordinate axis of the histogram as obtained after normalization thus becomes consistent with a probability density.

Figure 3B:
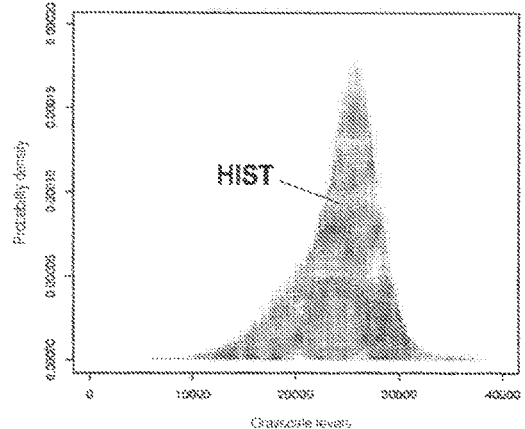

FIG. 3B shows the histogram obtained after normalizing the histogram HIST shown in FIG. 3A. For simplification purposes, the normalized histogram is also referred to as HIST.

It should be observed that this normalization step is optional. It serves advantageously to derive quality indices that are independent of the size of the 3D image under consideration (where the size of the image is defined as the number of its voxels). Such indices make it easy to compare 3D images of different sizes with one another. Nevertheless, it can be understood that if the 3D images under consideration are all of the same size, then such normalization is not useful.

Thereafter, the estimation device 1 extracts in a step E40 a plurality (i.e. K) Gaussian functions from the normalized histogram HIST (or the non-normalized histogram, where appropriate, if step E30 is not performed).

The invention relies on the assumption that the acquisition noise in the tomographic image im3D is essentially random Gaussian noise, and that as a result the gray-scale levels of the various phases of the composite material of the part 2 have a Gaussian distribution. On this assumption, the histogram HIST of the image im3D corresponds to a mixture of a plurality of Gaussian functions, and more precisely of K Gaussian functions, where K is the number of phases in the composite material (K=2 in the present example).

In order to identify the K Gaussian distributions present in the normalized histogram HIST, the estimation device 1 of the presently-described embodiment performs a deconvolution technique on Gaussian functions relying on the expectation maximization (EM) algorithm as described in detail in the above-cited document by Dempster et al.

The EM algorithm enables the estimation device 1 to determine for each of the K Gaussian distribution $G_i$, i=1, ..., K present in the histogram HIST various parameters characterizing that distribution, namely:

its mean $m_i$;

its standard deviation $\sigma_i$ or its variance $\sigma_i^2$; and the proportion $\alpha_i$ of the Gaussian distribution in the histogram HIST.

In known manner, the EM algorithm serves to maximize the likelihood of parameters of probabilistic models (i.e. above-mentioned parameters characterizing Gaussian distributions in this example), and for this purpose it relies, during a plurality of iterations, on performing two steps:

a step E of evaluating an expectation in which the expectation of the likelihood is calculated while taking account of the most recent estimates of the parameters; and a maximization step M in which the maximum likelihood of the parameters is estimated by maximizing the likelihood found in step E.

In the presently-described implementation, these steps E and M are performed more precisely as follows.

To begin with, the EM algorithm is initialized using an "initial" estimate of the parameters of the Gaussian functions. This initial estimate corresponds to parameter values defined by default or derived from known data, e.g. supplied on the composite material part 2 (e.g. the proportions of two phases within the composite material).

Thereafter, for each iteration iter≥1 that is performed:

During the step E(iter):

1) For each of the K Gaussian functions to be extracted from the histogram, using parameters determined at iteration iter−1 (or starting from the initial estimation of parameters for iter=1) quantities referred to as "responsibilities" that are written $\mu_k$, k=1, ..., K, are estimated for each gray-scale level class of the histogram HIST (represented by a representative x, e.g. x is the gray-scale level associated with the class when the class has only one gray-scale level, or x is the center of gravity (barycenter) of the gray-scale levels of the class when the class covers a plurality of gray-scale levels), with these responsibilities being defined by:

$$\mu_k(x) = \frac{D_k(x)}{\sum_{j=1}^{K} D_j(x)}$$

where $D_j$ designates a Gaussian function defined on the basis of its standard deviation and of its variance as estimated at iteration iter−1, i.e.:

$$D_j(x) = \frac{\alpha_j}{\sigma_j \sqrt{2\pi}} \exp\left(-\frac{(x - m_j)^2}{2\sigma_j^2}\right)$$

2) The likelihood expectation LE is then given by:

$$LE = \prod_{j=1}^{K} \prod_{i=1}^{N} \frac{1}{\sigma_j \sqrt{2\pi}} \exp\left(-\frac{(HIST(x_i) - m_j)^2}{2\sigma_j^2}\right)$$

where N designates the number of classes of the histogram HIST (or the number of gray-scale levels when each class of the histogram includes only one gray-scale level), $x_i$ is the representative of the class i of the histogram HIST, i=1, ..., N, and HIST($x_i$) is the value of the histogram for the class i, and K is the number of Gaussian functions extracted from the histogram HIST.

During the step M(iter): the estimation device 1 maximizes the likelihood expectation LE (or in equivalent manner, for simplification purposes, the logarithm of the likelihood expectation LE) relative to the parameters of the Gaussian functions. Calculating and setting to zero the partial derivatives of the logarithm of the likelihood expectation LE relative to the parameters (mean and standard deviation) of the K Gaussian functions leads to the estimation device 1 calculating the following values for the means, the standard deviations, and the proportions of the K Gaussian functions:

$$\hat{m}_k = \frac{1}{N} \sum_{i=1}^{N} \mu_k(x_i) HIST(x_i)$$

$$\hat{\sigma}_k = \frac{1}{N} \sum_{i=1}^{N} (\mu_k(x_i) HIST(x_i) - \hat{m}_k)^2$$

$$\hat{\alpha}_k = \frac{1}{N} \sum_{i=1}^{N} \mu_k(x_i) \text{ for } k = 1, \ldots, K.$$

These steps E and M are repeated until a predetermined stop criterion is satisfied. The likelihood LE thus increases on each iteration.

In the presently-described embodiment, the estimation device 1 stops iterations on detecting that the sum of the absolute values of the differences between the estimated parameters of the Gaussian functions ($\hat{m}_k$, $\hat{\sigma}_k$ et $\hat{\alpha}_k$ for k=1, ..., K) using the EM algorithm during two consecutive iterations iter and iter+1 is less than a predetermined threshold $\varepsilon$, $\varepsilon \geq 0$ (e.g. $\varepsilon = 10^{-3}$). In other words, depending on the stop criterion adopted by the estimation device 1, execution of the EM algorithm is stopped when the values of the estimate of the parameters characterizing the K Gaussian functions vary little or not at all between two successive iterations.

Naturally, other criteria for stopping the EM algorithm may be considered in a variant or in addition to the above-mentioned criterion, such as for example reaching some maximum number of iterations and/or comparing the error between the histogram HIST and the sum of the Gaussian functions characterized by the parameters estimated by the EM algorithm with a predetermined threshold $\varepsilon > 0$ (e.g. defined experimentally, e.g. $\varepsilon = 10^{-3}$).

It should be observed that although the EM algorithm is an algorithm that is very effective for estimating parameters of probabilistic models, it is an algorithm that does not always converge on an overall (global) maximum during the step M. This situation occurs in particular when it is impossible or almost impossible to identify the looked-for K Gaussian functions in the histogram. It generally leads to convergence that is very slow, which can be detected by comparing the number of iterations of the EM algorithm with a maximum authorized number of iterations (e.g. 1000, 2000, or even 10,000).

Figure 3C:
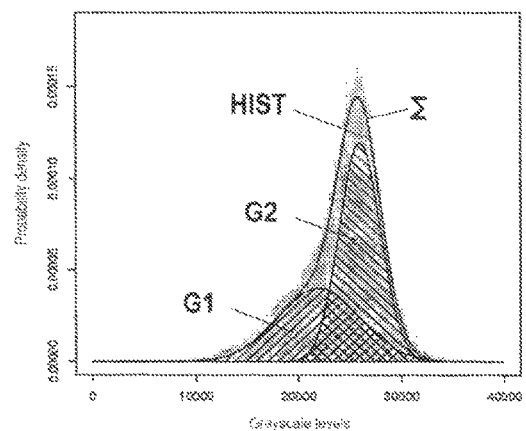

FIG. 3C shows two Gaussian distributions G1 and G2 extracted from the histogram HIST by applying the EM algorithm.

The Gaussian distribution G1 is characterized by a mean $m_1$=22000, a standard deviation $\sigma_1$=4002, and a proportion $\alpha_1$=40% in the histogram HIST. The Gaussian distribution G2 is characterized by a mean $m_2$=25997, a standard deviation $\sigma_2$=2001, and a proportion $\alpha_2$=60% in the histogram HIST.

The sum of the two Gaussian functions G1 and G2 is shown in FIG. 3C by the curve $\Sigma$. As can be seen, there is a very good match between this sum and the histogram HIST.

It should be observed that in the presently-described embodiment, the EM algorithm serves, for each Gaussian function extracted from the histogram HIST, to estimate its mean, its standard deviation, and its proportion in the histogram HIST. In a variant, the EM algorithm may be used to estimate only some of these parameters characterizing each Gaussian function present in the histogram HIST, while the other parameters are supplied to the estimation device 1. In particular, the mean and the proportion of each Gaussian function depend on the composite material from which the part 2 is made so they can be supplied to the estimation device 1, e.g. by a design office. In contrast, the standard deviation of each Gaussian function depends directly on the acquisition noise of the image im3D and is preferably estimated during deconvolution of Gaussian functions, by using the EM algorithm in the presently-described embodiment.

Furthermore, in the presently-described embodiment, the estimation device 1 uses the EM algorithm in order to extract the K Gaussian functions from the histogram. In a variant, other methods may be used to extract the Gaussian functions from the histogram and to determine their parameters, such as for example a Monte Carlo method based on Markov chains, a moment matching method, a spectral or a graphical method, or indeed a simulation.

In the presently-described embodiment, in order to propose quality indices that are robust in the face of changes in the dynamic ranges of the images (e.g. 8 bits, 16 bits, etc.), some of the Gaussian function parameters extracted during step E40 are normalized by the estimation device 1 so that the extents (supports) of the extracted Gaussian functions remain within the range 0 to 1 (step E50).

It should be observed that although the extent of a Gaussian function is infinite, from a theoretical point of view, more than 99% of the signal of a Gaussian function lies between its mean and plus or minus three times its standard deviation. The inventors have thus advantageously considered that the extent of the sum of the Gaussian functions lies for the most part in an interval defined by its minimum bound:

$$I\min = \min(m_1 - 3\sigma_1, m_2 - 3\sigma_2, \ldots, m_K - 3\sigma_K)$$

and its maximum bound:

$$I\max = \max(m_1 + 3\sigma_1, m_2 + 3\sigma_2, \ldots, m_K + 3\sigma_K)$$

Thus, during the step E50, the estimation device 1 normalizes the means and the standard deviations of the Gaussian functions $G_i$ extracted from the histogram HIST as follows:

$$m_i = \frac{m_i - I\min}{I\max - I\min}$$

$$\sigma_i = \frac{\sigma_i}{I\max - I\min}$$

for i=1, ..., K.

The proportions of each of the Gaussian functions in the histogram are naturally not concerned or impacted by such normalization.

Figure 3D:
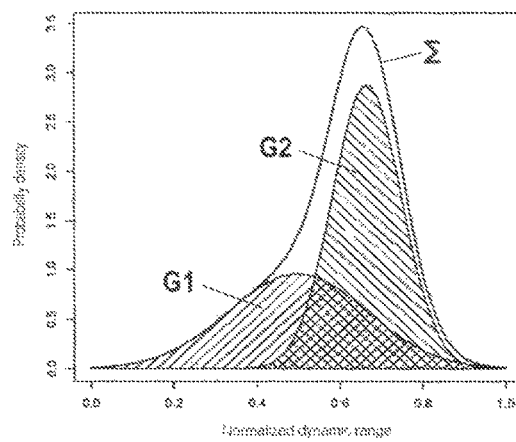

FIG. 3D shows the Gaussian functions $G_1$ and $G_2$ and the sum $\Sigma$ of FIG. 3C after normalization. The abscissa axis now corresponds to a dynamic range normalized from 0 to 1.

In accordance with the invention, the estimation device 1 then uses the normalized parameters of the Gaussian functions $G_i$, i=1, ..., K extracted from the histogram HIST to estimate (step E60) one or more quality indices of the image im3D.

In the presently-described embodiment, a plurality of quality indices are estimated by the estimation device 1 on the basis of the normalized means and standard deviations of the Gaussian functions.

More specifically, in the presently-described embodiment, the first index I1 estimated by the estimation device 1 relies on the notion of contrast between the phases of the composite material of the part 2.

In order to define this first index, the inventors have considered that if all of the Gaussian functions present in the histogram HIST were well separated from one another (i.e. if there was no intersection between the extents of the Gaussian functions), then distinguishing between the components or phases of the composite material of the part 2 would be trivial. In other words, the image im3D could be considered as being of good quality and would correspond to a quality index close to 1. Conversely, if the Gaussian functions coincide, that means there exists little contrast between the different phases of the composite material (the phases and thus the Gaussian functions then being impossible or quasi-impossible to separate), in other words that the image im3D is of poor quality, and should correspond to an index close to 0.

On the basis of this observation, the index I1 is estimated by the estimation device 1 by performing the following sequence of steps.

The Gaussian functions $G_i$, i=1, ..., K, extracted from the histogram HIST are initially classified by the estimation device 1 by increasing values of their means. For simplification purposes, the same notation is used for the Gaussian functions after they have been classified, in other words the Gaussian functions $G_i$, i=1, ..., K, are such that $m_1 \leq m_2 \leq \ldots \leq m_k$.

Thereafter, for each pair of contiguous Gaussian functions $(G_i, G_{i+1})$, it determines a factor $z_i$ such that:

$$z_i = m_i - m_{i+1} + \omega(\sigma_i + \sigma_{i+1})$$

where $\omega$ designates a predetermined constant. For example $\omega$=1.

On the basis of this factor $z_i$, the estimation device 1 derives a quality index I1(i) for each pair of Gaussian functions $(G_i, G_{i+1})$ using a function $\underline{f}$ that is bounded in the range 0 to 1 (i.e. whose values are bounded between 0 and 1). In the presently-described embodiment, the function $\underline{f}$ used for determining the quality index $I1(i)$ is a sigmoid function. In other words, the estimation device 1 evaluates each index $I1(i)$ as follows:

$$I1(i) = f(z_i) = \frac{1}{1 + e^{-\lambda z_i}}$$

where $\lambda$ designates a predefined negative number.

In a variant, other functions $\underline{f}$ bounded in the range 0 to 1 may be considered for defining the quality index $I1(i)$, such as for example a function $\underline{f}$ based on the hyperbolic tangent function.

Thereafter, the estimation device 1 calculates the mean of the quality indices $I1(i)$ and thus obtains the index $I1$. It should be observed that for K=2, as in the presently-described example, only one pair of Gaussian functions is identified in the histogram HIST, such that the estimation device 1 obtains the quality index $I1$ directly by calculating $f(z_1)$.

In the presently-described embodiment, the estimation device 1 also estimates in a step E60 a second quality index $I2$ for the image im3D. This second quality index $I2$ quantifies the overlap between the Gaussian functions $G_i$, i=1, . . . , K, extracted from the histogram HIST.

Specifically, the inventors consider that in order to define this second quality index, the smaller the area of overlap between the Gaussian functions compared with the total area occupied by the Gaussian functions, the greater the separation of the Gaussian functions, and the better the quality of the image (corresponding to an index $I2$ close to 1). Conversely, Gaussian functions having a large overlap area can be expected to represent an image of poor quality for which an index $I2$ close to 0 should be allocated.

In order to estimate the index $I2$, the estimation device 1 thus evaluates the areas occupied by the Gaussian functions extracted from the histogram HIST outside the overlap zones that exist between the Gaussian functions. By way of indication, FIG. 3D shows the overlap zone R between the Gaussian functions $G_1$ and $G_2$ extracted from the normalized histogram HIST of FIG. 3B.

More precisely, it estimates the index $I2$ using the following formula:

$$I2 = \int_0^1 \left[ \max_{1 \le k1 \le K} D_{k1}(x) - \max_{1 \le k2 \le K, k2 \ne k1} D_{k2}(x) \right] dx$$

with:

$$D_k(x) = \frac{\alpha_k}{\sigma_k \sqrt{2\pi}} \exp\left(-\frac{(x - m_k)^2}{2\sigma_k^2}\right)$$

In the presently-envisaged example where K=2, this gives:

$$I2 = \int_0^1 |D_1(x) - D_2(x)| dx$$

It should be observed that in the presently-described embodiment, the indices $I1$ and $I2$ are selected in such a manner as to tend towards 1 when the quality of the image im3D is good and conversely towards 0 when the image im3D is of poor quality. Nevertheless, it is naturally possible for some other convention to be considered providing its meaning is known to the operators who are to make use of these quality indices.

Finally, in the presently-described embodiment, the estimation device 1 also estimates K quality indices $I3(G_i)$ of the image im3D that are defined respectively for the K Gaussian functions $G_i$ extracted from the histogram HIST, i=1, . . . , K, and where each quality index $I3(G_i)$ is defined as the ratio between the mean $m_i$ and the standard deviation $\sigma_i$ of the Gaussian function. In other words, each quality index $I3(G_i)$ defines a signal-to-noise ratio:

$$I3(G_i) = \frac{m_i}{\sigma_i}$$

As a result of the Gaussian function deconvolution step E40, it is possible to calculate a signal-to-noise ratio for each phase of the composite material of the part 2. It is possible for each of the Gaussian functions extracted from the histogram HIST to apply the Rose criterion, which consists in asserting that the quality of an image is good (and more precisely that characteristics in the image can be distinguished with a confidence ratio of 100%) providing the signal-to-noise ratio is greater than 5.

Thereafter, the quality indices $I1$, $I2$, and $I3(G_i)$, i=1, . . . , K of the image im3D are then supplied by the estimation device 1 to an entity suitable for using and/or working on these indices or they are stored in its non-volatile memory 6 for later use, or indeed they are shown to a user, e.g. on the screen 7 of the estimation device 1.

It should be observed that although the indices $I1$, $I2$, and $I3$ all vary in the same direction as a result of the conventions adopted (indices $I1$ and $I2$ close to 1 when the quality of the 3D image is good and close to 0 otherwise), they do not vary identically as a function of the parameters of the Gaussian functions extracted from the histogram.

By way of illustration, FIGS. 4A-4F show different configurations for Gaussian functions together with the resulting indices $I1$ and $I2$. More precisely:

FIG. 4A shows two Gaussian functions G1 and G2 extracted from a histogram HIST having the following estimated parameters:
for the Gaussian function G1: $m_1$=8000, $\sigma_1$=4000, $\alpha_1$=40%;
for the Gaussian function G2: $m_2$=26000, $\sigma_2$=2000, $\alpha_2$=60%.
This results in quality indices $I1$=0.903 and $I2$=0.995.

FIG. 4B shows two Gaussian functions G1 and G2 extracted from a histogram HIST having the following estimated parameters:
for the Gaussian function G1: $m_1$=14000, $\sigma_1$=4000, $\alpha_1$=40%;
for the Gaussian function G2: $m_2$=26000, $\sigma_2$=2000, $\alpha_2$=60%.
This results in quality indices $I1$=0.792 and $I2$=0.959.

FIG. 4C shows two Gaussian functions G1 and G2 extracted from a histogram HIST having the following estimated parameters:
for the Gaussian function G1: $m_1$=23000, $\sigma_1$=4000, $\alpha_1$=40%;
for the Gaussian function G2: $m_2$=26000, $\sigma_2$=2000, $\alpha_2$=60%.
This results in quality indices $I1$=0.302 and $I2$=0.529.

In other words, shifting the mean of the Gaussian function G1 towards the mean of the Gaussian function G2 leads to a significant reduction in both indices I1 and I2, but with the index I1 decreasing more than the index I2.

In similar manner:

FIG. 4D shows two Gaussian functions G1 and G2 extracted from a histogram HIST having the following estimated parameters:
for the Gaussian function G1: $m_1=23000$, $\sigma_1=500$, $\alpha_1=40\%$;
for the Gaussian function G2: $m_2=26000$, $\sigma_2=2000$, $\alpha_2=60\%$.

This results in quality indices I1=0.569 and I2=0.808.

FIG. 4E shows two Gaussian functions G1 and G2 extracted from a histogram HIST having the following estimated parameters:
for the Gaussian function G1: $m_1=23000$, $\sigma_1=1000$, $\alpha_1=40\%$;
for the Gaussian function G2: $m_2=26000$, $\sigma_2=2000$, $\alpha_2=60\%$.

This results in quality indices I1=0.500 and I2=0.686.

FIG. 4F shows two Gaussian functions G1 and G2 extracted from a histogram HIST having the following estimated parameters:
for the Gaussian function G1: $m_1=23000$, $\sigma_1=1500$, $\alpha_1=40\%$;
for the Gaussian function G2: $m_2=26000$, $\sigma_2=2000$, $\alpha_2=60\%$.

This results in quality indices I1=0.438 and I2=0.608.

In other words, an increase in the standard deviation of the Gaussian function G1 leads to a decrease in both indices I1 and I2, but with the index I2 nevertheless decreasing more than the index I1.

The choice of one or more indices from among these indices thus needs preferably to be guided as a function of the intended application.

Thus, the invention proposes a method making it possible automatically to measure the quality of a gray-scale encoded 3D image, such as a tomographic image, of a piece (i.e. part) of composite material. These quality indices may be used in various ways. This measurement, made available in particular by the various quality indices described in detail above, presents numerous advantageous characteristics. Thus, it is repeatable, thereby providing an objective tool for verifying the quality of an image or for comparing images with one another, it is accurate, robust against noise, fast (only a few seconds are needed for processing an image), normalized, and easy to interpret, it does not require any parameter other than the number of Gaussian functions that are to be extracted, and does not rely on a reference image.

Quality indices derived in accordance with the invention can be used in various ways, both for surveying pieces of equipment and in a production line. For example, they may be used to optimize parameters for acquiring and reconstructing 3D images, for comparing 3D images with one another, or indeed for detecting possible drifts in the 3D image acquisition equipment of a production line (e.g. drift in the detector or the X-ray tube used for tomography, in particular as the tomography equipment ages), etc. These applications may rely on one or more quality indices estimated in accordance with the invention.

The invention claimed is:

1. An estimation method for estimating at least one quality index of a gray-scale encoded three-dimensional image of a composite material part, the estimation method comprising:

obtaining a histogram from the image, representing for each class of a plurality of classes each comprising at least one gray-scale level, a number of voxels of the image having a gray-scale level belonging to the class;

extracting a predetermined number of Gaussian functions present in the histogram, the predetermined number corresponding to a number of distinct phases present in the composite material part; and estimating at least one quality index of the image from parameters characterizing the Gaussian functions extracted from the histogram, wherein said at least one quality index of the image comprises an index quantifying overlap between the Gaussian functions extracted from the histogram.

2. The estimation method according to claim 1, wherein the extracting comprises, for at least one Gaussian function, estimating at least one parameter characterizing the Gaussian function, the at least one parameter selected from:

the mean of the Gaussian function;

the standard deviation or the variance of the Gaussian function; and the proportion of the Gaussian function in the histogram.

3. The estimation method according to claim 1, wherein said at least one quality index of the image comprises an index I1 obtained by averaging on each pair $(G_i, G_{i+1})$ of contiguous Gaussian functions extracted from the histogram a quality index I1(i) associated with said pair $(G_i, G_{i+1})$ and estimated using:

$$I1(i) = f(m_i = m_{i+1} \omega \cdot (\sigma_i + \sigma_{i+1}))$$

where:

$m_i$ and $m_{i+1}$, designate respective means of the Gaussian functions $G_i$ and $G_{i+1}$, with $m_i < m_{i+1}$;

$\sigma_i$ and $\sigma_{i+1}$ designate respective standard deviations of the Gaussian functions $G_i$ and $G_{i+1}$;

$\omega$ designates a predetermined constant; and f designates a bounded function having values in a range 0 to 1.

4. The estimation method according to claim 1, wherein said at least one quality index of the image comprises, for a Gaussian function extracted from the histogram, an index I3(G) associated with said Gaussian function and defined as a ratio between a mean and a standard deviation of said Gaussian function.

5. The estimation method according to claim 1, wherein the extracting comprises applying an expectation maximization algorithm.

6. The estimation method according to claim 1, further comprising normalizing the histogram, the Gaussian functions being extracted from the normalized histogram during the extracting.

7. The estimation method according to claim 1, further comprising normalizing parameters characterizing the Gaussian functions, said at least one quality index of the image being estimated from parameters characterizing the normalized Gaussian functions.

8. The estimation method according to claim 1, wherein said index quantifying overlap between the Gaussian functions $G_i$, i=1,...,K, extracted from the histogram is an index I2 calculated as $$I2 = \int_0^1 \left[ \max_{1 \leq k1 \leq K} D_{k1}(x) - \max_{1 \leq k2 \leq K, k2 \neq k1} D_{k2}(x) \right] dx$$

with:

$$D_k(x) = \frac{\alpha_k}{\sigma_k \sqrt{2\pi}} \exp\left(-\frac{(x - m_k)^2}{2\sigma_k^2}\right)$$

in which $m_k$ designates a mean of the respective Gaussian function $G_k$;

$\sigma_k$ designates a standard deviation of the respective Gaussian function $G_k$;

$\alpha_k$ designates a proportion of the respective Gaussian function $G_k$; and x designates a gray-scale level associated with the class when the class has only one gray-scale level, or a center of gravity of the gray-scale levels of the class when the class covers a plurality of gray-scale levels.

9. A non-transitory computer readable data medium storing a computer program including instructions for executing steps of the estimation method according to claim 1.

10. An estimation device for estimating at least one quality index of a gray-scale encoded three-dimensional image of a composite material part, the estimation device comprising:

a processor configured to:

obtain a histogram from the image, representing, for each class of a plurality of classes each comprising at least one gray-scale level, a number of voxels of the image having a gray-scale level belonging to the class;

extract a predetermined number of Gaussian functions present in the histogram, the predetermined number corresponding to a number of distinct phases present in the composite material part; and estimate at least one quality index of the image from parameters characterizing the Gaussian functions extracted from the histogram, wherein said at least one quality index of the image comprises an index quantifying overlap between the Gaussian functions extracted from the histogram.

11. The estimation device according to claim 10, wherein said index quantifying overlap between the Gaussian functions $G_i$, i=1,...,K, extracted from the histogram is an index I2 calculated as $$I2 = \int_0^1 \left[ \max_{1 \le k1 \le K} D_{k1}(x) - \max_{1 \le k2 \le K, k2 \ne k1} D_{k2}(x) \right] dx$$

with:

$$D_k(x) = \frac{\alpha_k}{\sigma_k \sqrt{2\pi}} \exp\left(-\frac{(x-m_k)^2}{2\sigma_k^2}\right)$$

in which $m_k$ designates a mean of the respective Gaussian function $G_k$;

$\sigma_k$ designates a standard deviation of the respective Gaussian function $G_k$;

$\alpha_k$ designates a proportion of the respective Gaussian function $G_k$; and x designates a gray-scale level associated with the class when the class has only one gray-scale level, or a center of gravity of the gray-scale levels of the class when the class covers a plurality of gray-scale levels.

12. An estimation method for estimating at least one quality index of a gray-scale encoded three-dimensional image of a composite material part, the estimation method comprising:

obtaining a histogram from the image, representing for each class of a plurality of classes each comprising at least one gray-scale level, a number of voxels of the image having a gray-scale level belonging to the class;

extracting a predetermined number of Gaussian functions present in the histogram, the predetermined number corresponding to a number of distinct phases present in the composite material part; and estimating at least one quality index of the image from parameters characterizing the Gaussian functions extracted from the histogram, wherein said at least one quality index of the image comprises an index I1 obtained by averaging on each pair $(G_i, G_{i+1})$ of contiguous Gaussian functions extracted from the histogram a quality index I1(i) associated with said pair $(G_i, G_{i+1})$ and estimated using:

$$I1(i) = f(m_i = m_{i+1} \omega \cdot (\sigma_i + \sigma_{i+1}))$$

where:

$m_i$ and $m_{i+1}$ designate respective means of the Gaussian functions $G_i$ and $G_{i+1}$, with $m_i < m_{i+1}$;

$\sigma_i$ and $\sigma_{i+1}$ designate respective standard deviations of the Gaussian functions $G_i$ and $G_{i+1}$;

$\omega$ designates a predetermined constant; and f designates a bounded function having values in a range 0 to 1.

* * * * *